United States Patent [19]

Walker

[11] Patent Number: 5,007,880
[45] Date of Patent: Apr. 16, 1991

[54] BEVEL SPLINED ARTICULATED JOINT

[76] Inventor: Stanley L. Walker, Rte. 4, Box 13, Eureka Springs, Ark. 72632

[21] Appl. No.: 521,231

[22] Filed: May 9, 1990

[51] Int. Cl.$^5$ .............................................. F16D 3/18
[52] U.S. Cl. .................................................... 464/159
[58] Field of Search ......................... 464/151, 156–159

[56] References Cited

U.S. PATENT DOCUMENTS

| | | | |
|---|---|---|---|
| 2,951,396 | 9/1960 | Kooistra | 464/159 |
| 3,054,275 | 9/1962 | Ongaro | 464/156 |
| 3,142,972 | 8/1964 | Spaulding | 464/159 |
| 3,826,108 | 7/1974 | Bradel, Jr. | 464/156 |
| 3,940,946 | 3/1976 | Anderson | 464/156 X |
| 4,132,090 | 1/1979 | McDermott | 464/156 |
| 4,464,141 | 8/1984 | Brown | 464/159 X |
| 4,824,418 | 4/1989 | Taubert | 464/159 |

*Primary Examiner*—Thomas R. Hannon
*Attorney, Agent, or Firm*—Head & Johnson

[57] ABSTRACT

A joint adaptable to a wide range of speed and torque conditions and articulable to a maximum predetermined angle $\phi$ of up to 30° or greater includes a cylindrical socket with a major inner diameter complimentary to a predetermined diameter 'd' and a preselected number 'n' of longitudinal internal splines integrally and uniformly extending inwardly from the major diameter and centered on planes cyclically angularly disposed through a longitudinal axis of the socket and a ball with an exterior surface defined by rotation of a first circular arc about a longitudinal axis of the ball. The first arc point of origin is along a line defined by the intersection of a plane containing the first arc and the ball axis with a plane passing transversely through a midpoint on the ball axis. The first arc radius is determined as '$r_{ball}$'=d $(1.25-3 \text{ Tan } \phi/2+2.25 \text{ Tan}^2 \phi/2)^{\frac{1}{2}}$ and the first arc point of origin is spaced from the ball axis by a distance '$x_{ball}$'=d/2. A preselected number 'n' of external splines with an exterior surface defined by rotation of a second circular arc about the ball axis integrally outwardly extend from the ball centered on planes cyclically angularly disposed through the ball axis. The second arc point of origin is also along the above identified line and its radius is determined as '$r_{spline}$'=d (1-Tan $\phi/2$). The second arc point of origin is spaced from the axis by a distance '$x_{spline}$'=d (0.50-Tan $\phi/2$). The exterior edges of adjacent external splines are spaced at a constant distance and are meshably insertable between the internal splines when the ball and socket longitudinal axes are aligned.

8 Claims, 4 Drawing Sheets

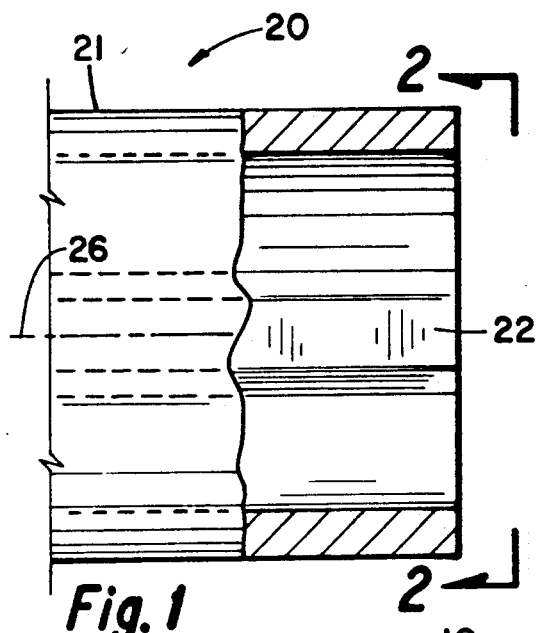
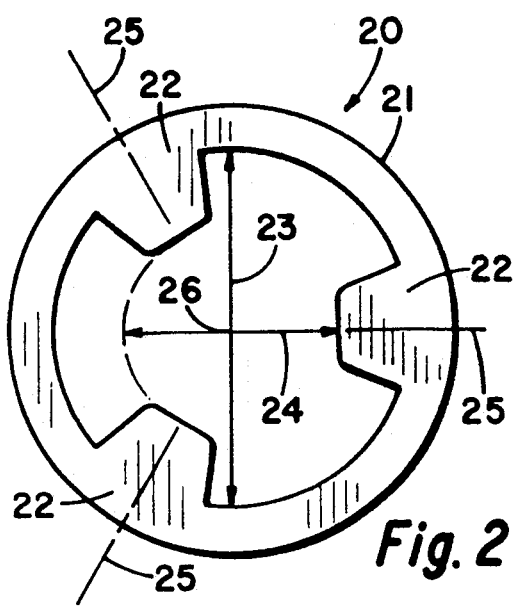
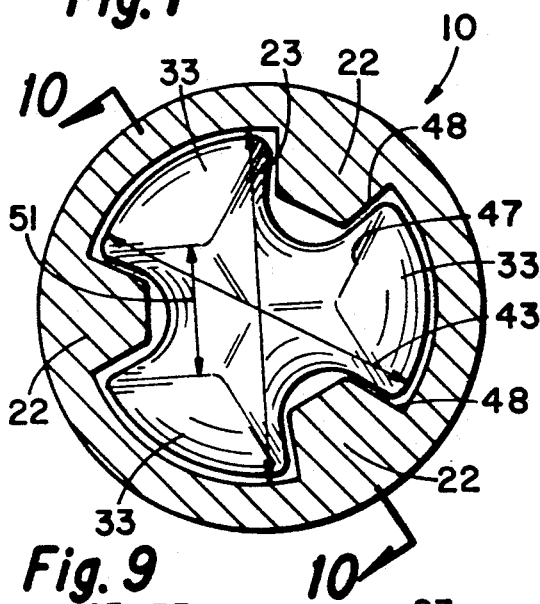
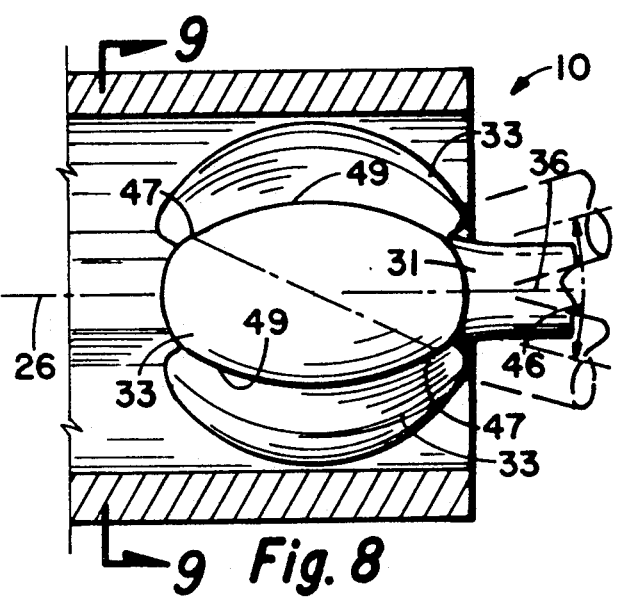
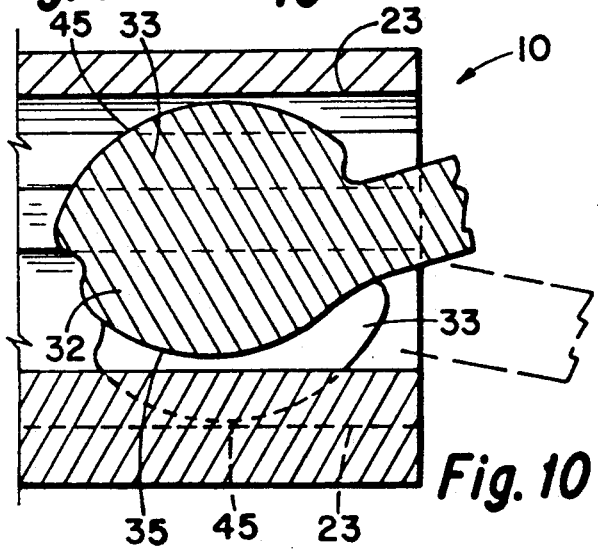

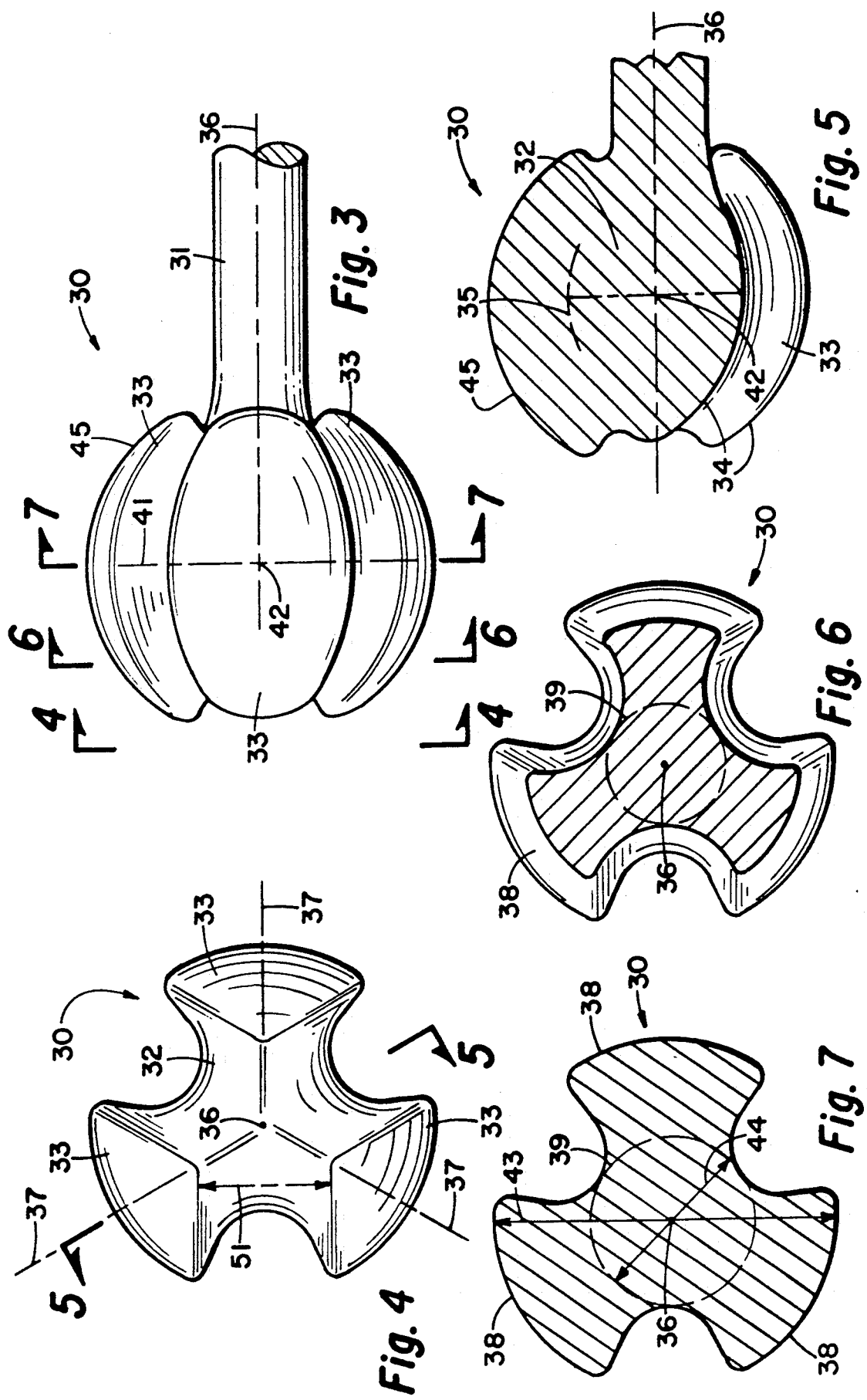

BEVEL SPLINED ARTICULATED JOINT

BACKGROUND OF THE INVENTION

This invention relates generally to articulated joints and more particularly concerns joints coupling shafts for random articulation over a preselected maximum range of articulation.

In most known articulated or hinged joints, a first drive element at the end of a first rotary shaft pivotally engages a second drive element at the end of a second rotary shaft in a manner that allows the shafts to pivot with respect to each other about fixed pivotal axes, multiple pivots providing a relatively full range of motion. Such articulated joints are known as cardan or universal joints. They are excessively complex, overly space consuming, difficult to manufacture, assemble, encapsulate and maintain and not readily adaptable to both high and low drive powers.

Other joints have been developed which apply a ball and socket principle in which splines on the ball engage within grooves in the socket to provide a more truly random movement of the joint. The ball and socket joints presently known, however, have relatively limited range of articulation and are not adaptable to high speed, high torque conditions.

Therefore, it is among the objects of this invention to provide an articulated joint constructed of simple elements, having limited space requirements, easily encapsulated, easily manufactured, assembled and maintained, capable of handling the angular velocity of drive trains and readily adaptable to transmit large and small torques.

SUMMARY OF THE INVENTION

In accordance with the invention, an articulated joint includes a male drive element having a multiplicity of splines bevelled or tapered longitudinally, vertically and transversely on its surface and parallel to the longitudinal axis of the shaft to which the male drive element is attached. A hollow, cylindrical female drive element has parallel splineways on its inner surface parallel to the axis of the shaft to which the female drive element is attached. The number of female splineways corresponds to the number of splines on the male drive element. The female splineways are configured to complement, within desired degrees of tolerance, the profile of the splines on the male member. The major inside diameter of the female drive element complements the major outside transverse diameter of the male drive element and the minor inside diameter of the female drive element complements the minor outside transverse diameter of the male drive element so that the splines of the male drive element are in constant mesh with the splineways of the female drive element. The major and minor longitudinal radii of the male drive element as well as the number of splines are determined in relationship to the desired angle of articulation of the joint and the particular torque-speed requirements of the joint.

The splines of the male drive element engage the splineways of the female drive element to transfer angular rotation between the members. It is of no significance which drive element is rotated by the driving shaft and which drive element rotates the driven shaft. The multiple bevels or tapers of the male drive member allow variable angular displacement of the longitudinal axis of the male drive element in relation to the longitudinal axis of the female drive element while maintaining a constant mesh between the splines and the splineways. The multiple bevel of the splines also eases assembly of the joint, minimizes the need for close manufacturing tolerances and creates a purging action to move any contamination of the joint away from the working surface, thus furthering the objects of the invention.

Preferably, the male drive element will have at least three splines and the female drive element a corresponding number of splineways. An even number splines, such as eight or sixteen, is adaptable to many applications. The bevels of the splines are determined from the maximum allowable angular deflection between the axes of the drive element and the driven element and by the number of splines, the torque capacity required and other considerations related to manufacturing and the materials from which the drive elements will be fabricated. The male drive element is truncated to allow a continuous mesh between the splines and the splineways at permissible limits of angular deflection between the axes of the drive element and the driven element.

BRIEF DESCRIPTION OF THE DRAWINGS

Other objects and advantages of the invention will become apparent upon reading the following detailed description and upon reference to the drawings in which:

FIG. 1 is a fragmentary cross-section of the female member of the 3-spline embodiment.

FIG. 2 is a view looking along plane 2—2 of FIG. 1 showing the end of this member.

FIG. 3 is an elevation of the male member of the 3-spline embodiment.

FIG. 4 is a view along plane 4—4 of FIG. 3.

FIG. 5 is a view along plane 5—5 of FIG. 4.

FIG. 6 is a view along plane 6—6 of FIG. 3.

FIG. 7 is a view along plane 7—7 of FIG. 3.

FIG. 8 is a view of the 3-spline embodiment, showing the female member in cross-section and the male member engaged.

FIG. 9 is a view along plane 9—9 of FIG. 8.

FIG. 10 is a view along plane 10—10 of FIG. 9.

DETAILED DESCRIPTION

Figure 12:
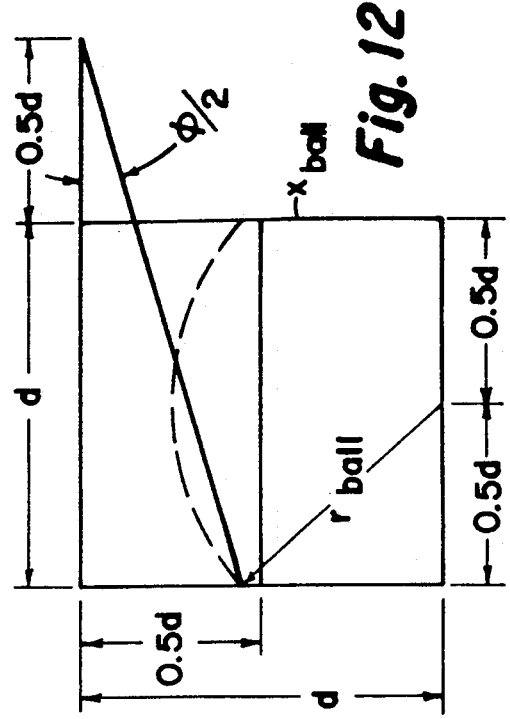
FIG. 12 is a diagrammatic figure illustrating the derivation of equations pertinent to the invention.

FIGS. 1 through 10 illustrate a three-splined embodiment 10 of the articulated joint of the present invention. FIGS. 1 and 2 show the female portion 20 of the joint 10 which consists of a cylindrical inlet 21 with three longitudinal internal splines 22 integrally and uniformly extending inwardly from the cylindrical socket 21. The splines 22 extend inwardly from the major diameter 23 of the socket 21 to the minor diameter 24 of the socket 21. The splines 22 are centered on planes 25 which are cyclically, angularly disposed through the socket longitudinal axis 26. For this three-splined embodiment 10, the planes 25 will be readily seen to be spaced at 120° intervals.

The male portion 30 of the three-splined articulated joint 10 is illustrated in FIGS. 3 through 7. A shaft 31 extends integrally to a ball 32 from which three external splines 33 integrally extend. FIG. 5 illustrates the exterior surface 34 of the ball 32 in relation to the integrally extending splines 33. The exterior surface 34 is defined by rotation of a circular arc 35 about the longitudinal axis 36 of the male portion 30 of the joint 10. This is also the longitudinal axis of the ball 32 and the splines 33. The external splines 33 of the ball 32 are, of course, centered on planes 37 which, as in the case of the female portion 20, are cyclically, angularly disposed through the male portion longitudinal axis 36. For this three-splined ball 32, the cycle is 120°. Looking at FIGS. 6 and 7, it can readily be seen that any cross section of the male portion 30 taken in a plane transverse to the longitudinal axis 36 will reveal a circular exterior spline surface 38 and a circular exterior ball surface 39. In particular, FIG. 7 is a cross section taken in a plane 41 transverse to and through the mid point 42 of the longitudinal axis 36 of the ball 32. In this cross section it can be seen that the male portion 30 has a maximum major diameter 43 and a maximum minor diameter 44. Turning back to FIGS. 3 and 5, it will be seen that the exterior surfaces 45 of the splines 33 are also defined by rotation of a circular arc about the longitudinal axis 36.

The complete three-splined joint 10 is illustrated in FIGS. 8, 9 and 10. The major diameter 43 of the male portion 30 is seen to complement the major diameter 23 of the socket portion 20. That is, with the longitudinal axis 26 of the socket portion 20 aligned with the longitudinal axis 36 of the male portion 30, the male portion splines 33 may be easily but snugly inserted between the socket portion splines 22.

With the male 30 and socket 20 portions so engaged, the principles related to the range of motion of the joint 10 can be understood. If the male portion 30 were a perfect sphere and the socket 20 had no splines 22, then the male portion 30 could rotate fully in the socket 20 limited only by the shaft 31. But with the splines 22 and 33 meshed for rotation together, the range of motion 46 would be limited by the contact of diagonally opposite points 47 on one of the male splines 33 with the surfaces 48 of adjacent socket splines 22. On the other hand, the strength and continuity of the joint 10 could be greatly enhanced if the exterior surfaces of the splines 33 were coordinated for maximum rotational engagement between the splines 22 of the socket 20. This can be accomplished if the radius of the arc 45 is greater than the major inside radius of the socket 20.

Figure 11:
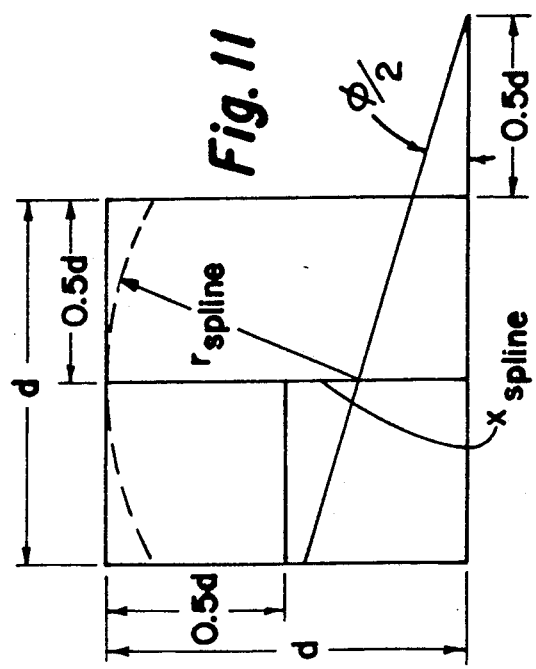
FIG. 11 is a diagrammatic figure illustrating the derivation of equations pertinent to the invention.

This preferred configuration can be accomplished by application of equations derived in reference to FIG. 11 in which 'd' represents the complimentary major diameter 43 of the male portion 30, '$\phi$' represents the desired angle of articulation 46, 'r' represents the radius of the arc 45 and 'x' represents the distance from the point of origin of the arc 45 to the longitudinal axis 36 of the male portion 30. Simple trigonometry applied to the Figure results in the equations:

$r_{spline} = d(1 - \tan \phi/2)$; and $x_{spline} = d(0.5 - \tan \phi/2)$.

If the spline surfaces are established according to these equations, then the taper of the exterior edges 49 of the splines 33 can be coordinated by spacing them at a constant distance 51 shown in FIGS. 4 and 9 to receive the socket splines 22 between them.

The joint 10 can be further improved by coordinating the dimensions of the ball 32 to the dimensions of the splines 33. This can be accomplished by application of further equations derived in reference to FIG. 12 in which the representative symbols are as defined in relation to FIG. 11. Simple trigonometry applied to these Figures results in the equations:

$r_{ball} = d(1.25 - 3 \tan \phi/2 = 2.25 \tan^2 \phi/2)^{\frac{1}{2}}$; and $x_{ball} = d/2$.

As shown in FIG. 10, with the ball 32 and splines 33 thus coordinated, not only will be surface 45 of the spline 33 follow the surface of the major diameter 23 of the socket 20, but the surface 35 of the ball 32 can be brought into conformance to the minor diameter 24 of the socket 20.

As a result of this coordinated design, extremely close tolerances between the male portion splines 33 and the socket portion splines 22 are not required. However, these tolerances can be drawn as reasonably close as the user would desire.

Figure 13:
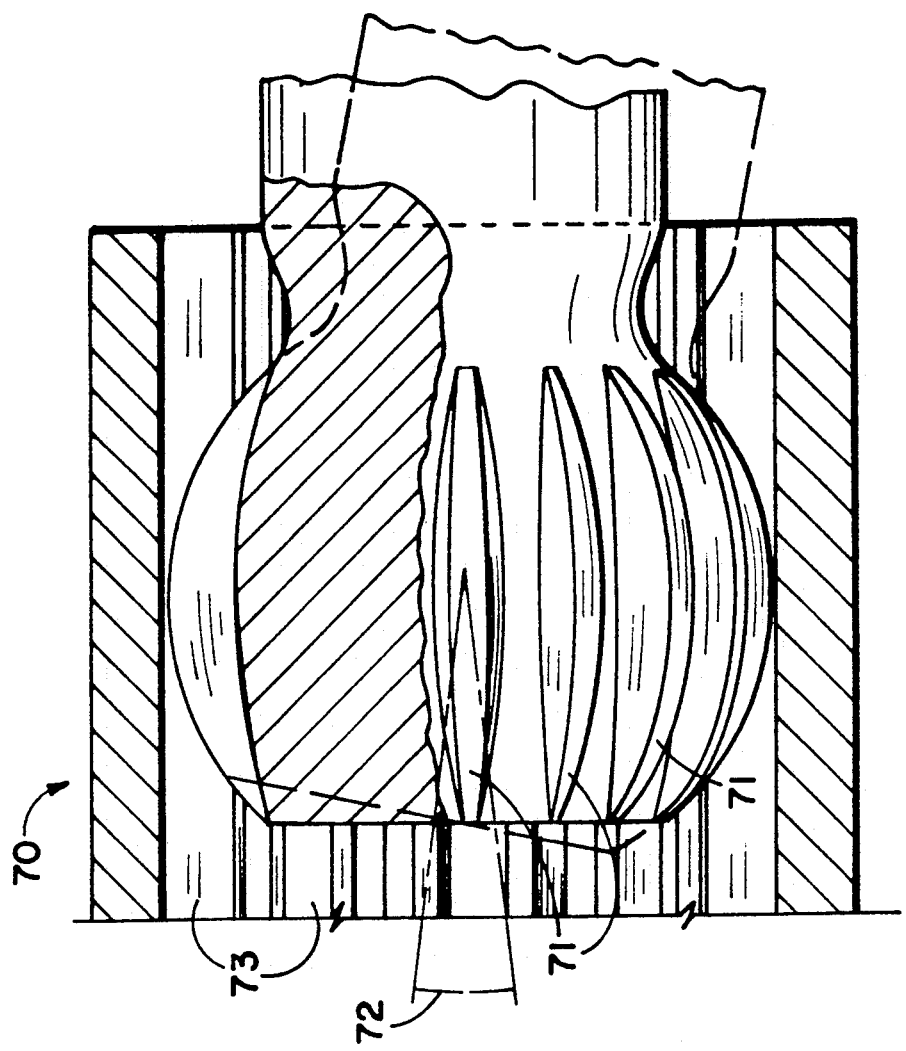
FIG. 13 is a view of the 16-spline embodiment, showing the female member in cross-section and the male member in fragmentary cross-section engaged.
Figure 14:
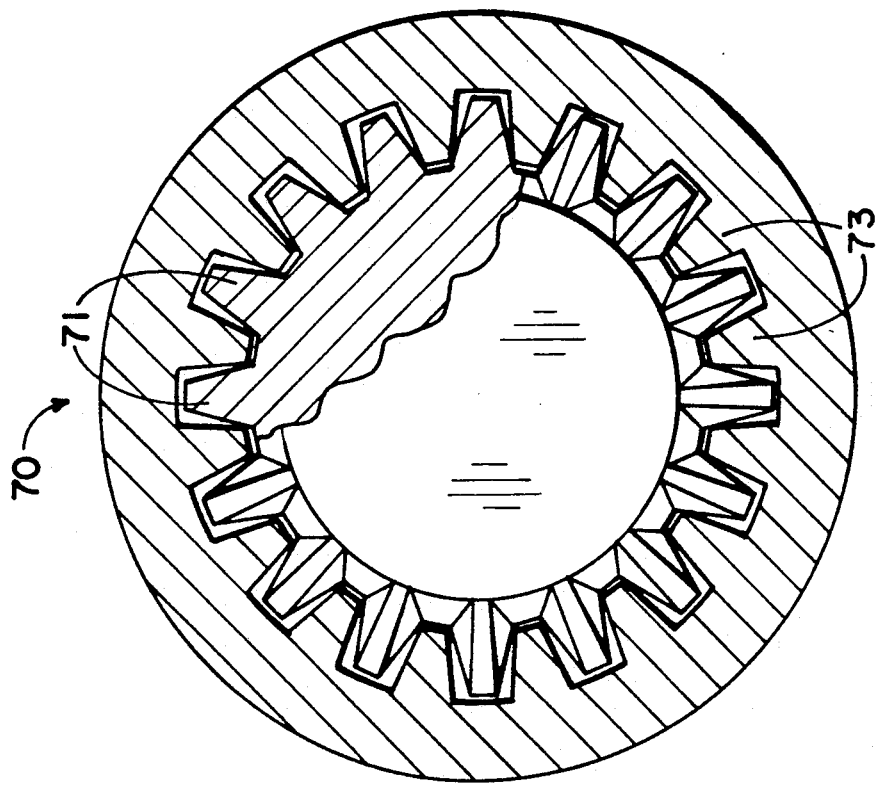
FIG. 14 is a view of the 16-spline embodiment taken 90° from FIG. 13.

FIGS. 13 and 14 illustrate a sixteen spline joint 70 formed according to the same principles above described. In a sixteen spline joint 70, the narrowness of the male splines 71 would limit the articulation angle 72 to an approximate maximum of 12° before being stopped by the socket splines 73. Therefore, for this joint 70, the angle $\phi$ would be approximately 12°. The configuration of the cross section of the splines 71 and 73 illustrates to some degree the range of permissible tolerances while still achieving excellent torque-speed characteristics.

Figure 16:
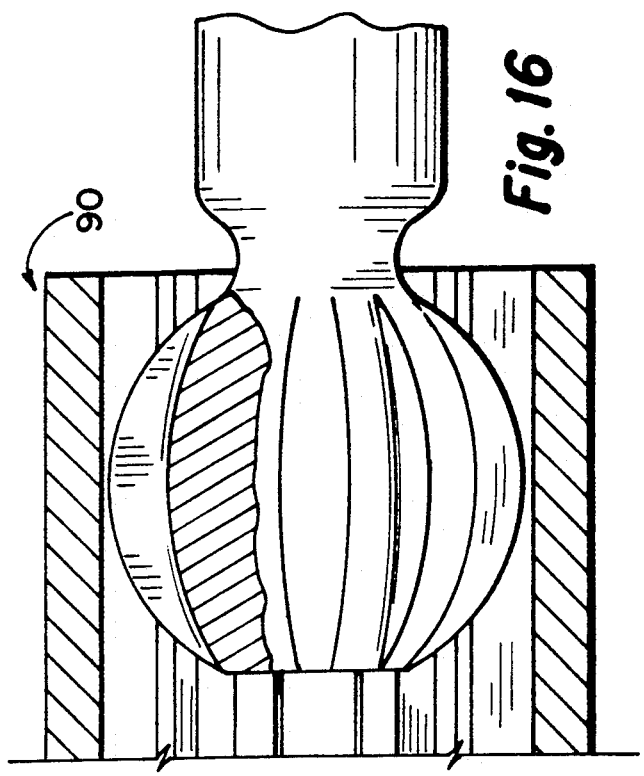
FIG. 16 is a view similar to FIG. 13 of the 8-spline embodiment.
Figure 15:
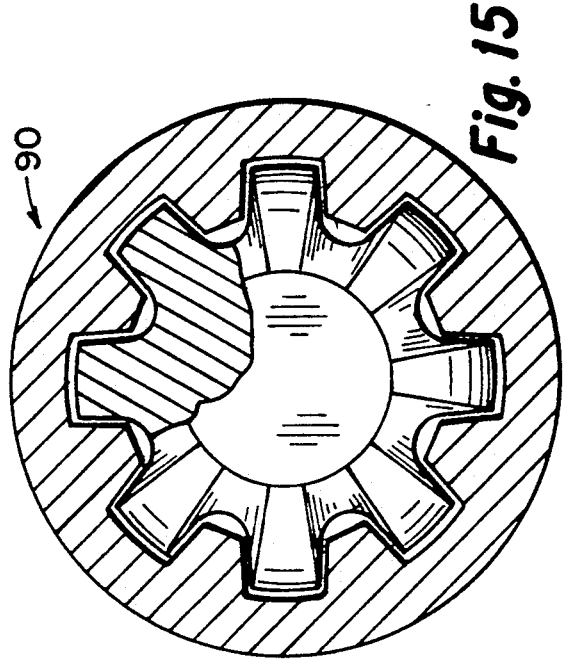
FIG. 15 is a view similar to FIG. 14 of the 8-spline embodiment.

FIGS. 15 and 16 illustrate an eight-spline joint 90 also formed according to the same principles above described. Such a joint 90 has been found well suited to achieve articulation angles in the range of 20°.

It will be apparent that any number 'n', three or more, of splines may be employed for given selected angles of articulation. The greater number 'n' of splines results in smaller angles of articulation $\phi$. But, by application of the equations developed and the resulting splines which bevel or taper longitudinally, transversely and vertically, a wide range of torque-speed requirements can be met by coordinating n and $\phi$ to the purpose.

The joint may be formed from any metal, plastic, or other material having suitable characteristics for the given application.

Thus, it is apparent that there has been provided, in accordance with the invention, a bevel splined articulated joint that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A joint articulable to a maximum predetermined angle $\phi$ comprising:
   a cylindrical socket having a major inner diameter complimentary to a predetermined diameter 'd' and a preselected number 'n', at least three, longitudinal internal splines integrally and uniformly extending inwardly from said major diameter and centered on planes cyclically angularly disposed through a longitudinal axis of said socket;

a ball having a preselected number 'n', at least three, of external splines integrally outwardly extending from said ball, said splines being centered on planes cyclically angularly disposed through a longitudinal axis of said ball and having an exterior surface defined by rotation of a circular arc about said ball axis, said arc having a radius '$r_{spline}$'=$d$ (1−Tan $\phi/2$) and said arc point of origin being spaced from said axis by a distance '$x_{spline}$'=$d(0.50-\text{Tan }\phi/2)$, said external splines having exterior edges, said exterior edges of adjacent external splines being spaced at a constant distance and said external splines being meshably insertable between said internal splines when said ball and socket longitudinal axes are aligned.

2. A device according to claim 1 wherein:
n=3 and
$\phi$=30°

3. A device according to claim 1 wherein:
n=8
$\phi$=20°

4. A device according to claim 1 wherein:
n=16
$\phi$=12°

5. A joint articulable to a maximum predetermined angle $\phi$ comprising:
a cylindrical socket having a major inner diameter complimentary to a predetermined diameter 'd' and a preselected number 'n', at least three, longitudinal internal splines integrally and uniformly extending inwardly from said major diameter and centered on planes cyclically angularly disposed through a longitudinal axis of said socket;

a ball having an exterior surface defined by rotation of a first circular arc about a longitudinal axis of said ball, said first arc having a point of origin along a line defined by the intersection of a plane containing said first arc and said ball axis with a plane passing transversely through a midpoint on said ball axis, said first arc having a radius '$r_{ball}$'=d $(1.25-3\text{Tan }\phi/2 +2.25\text{ Tan}^2\phi/2)^{\frac{1}{2}}$ and said first arc point of origin being spaced from said ball axis by a distance '$x_{ball}$'=d/2;

a preselected number 'n', at least three, of external splines integrally outwardly extending from said ball, said splines being centered on planes cyclically angularly disposed through said ball axis and having an exterior surface defined by rotation of a second circular arc about said ball axis, said second arc having a point of origin along said line, said second arc having a radius '$r_{spline}$'=d (1-Tan $\phi/2$) and said second arc point of origin being spaced from said axis by a distance '$x_{spline}$'=d (0.50-Tan $\phi/2$), said external splines having exterior edges, said exterior edges of adjacent external splines being spaced at a constant distance and said external splines being meshably insertable between said internal splines when said ball and socket longitudinal axes are aligned.

6. A device according to claim 5 wherein:
n=3 and
$\phi$=30°

7. A device according to claim 5 wherein:
n=8
$\phi$=20°

8. A device according to claim 1 wherein:
n=16
$\phi$=12°

* * * * *